(12) United States Patent
Sakai

(10) Patent No.: US 7,409,579 B2
(45) Date of Patent: Aug. 5, 2008

(54) DISK ARRAY DEVICE HAVING POINT VALUE ADDED OR SUBTRACTED FOR DETERMINING WHETHER DEVICE IS DEGRADED

(75) Inventor: Tomohiro Sakai, Tokyo (JP)

(73) Assignee: NEC Corporation, Tokyo (JP)

( * ) Notice: Subject to any disclaimer, the term of this patent is extended or adjusted under 35 U.S.C. 154(b) by 410 days.

(21) Appl. No.: 10/781,709

(22) Filed: Feb. 20, 2004

(65) Prior Publication Data

US 2004/0205381 A1    Oct. 14, 2004

(30) Foreign Application Priority Data

Feb. 20, 2003  (JP) ............................ 2003-042027

(51) Int. Cl.
*G06F 11/00* (2006.01)
(52) U.S. Cl. ......................................................... 714/5
(58) Field of Classification Search ............... 714/5, 714/6, 7, 8, 770; 711/114
See application file for complete search history.

(56) References Cited

U.S. PATENT DOCUMENTS

| | | | | |
|---|---|---|---|---|
| 5,278,838 A * | 1/1994 | Ng et al. | .......................... | 714/6 |
| 5,611,069 A * | 3/1997 | Matoba | ...................... | 711/114 |
| 5,612,933 A * | 3/1997 | Iso et al. | .................. | 369/44.27 |
| 5,631,909 A * | 5/1997 | Weng et al. | .................. | 714/704 |
| 5,812,761 A * | 9/1998 | Seki et al. | ...................... | 714/54 |
| 6,006,016 A * | 12/1999 | Faigon et al. | .................. | 714/48 |
| 6,145,052 A * | 11/2000 | Howe et al. | .................. | 711/112 |
| 6,330,620 B1 * | 12/2001 | Uchida | ........................... | 710/1 |
| 6,397,347 B1 * | 5/2002 | Masuyama et al. | .............. | 714/5 |
| 6,434,711 B1 * | 8/2002 | Takiyanagi | ..................... | 714/8 |
| 6,560,662 B1 * | 5/2003 | Sakai | .......................... | 710/104 |
| 6,687,846 B1 * | 2/2004 | Adrangi et al. | ................. | 714/4 |
| 6,810,491 B1 * | 10/2004 | Yamamoto et al. | ............. | 714/7 |
| 6,957,291 B2 * | 10/2005 | Moon et al. | .................. | 710/302 |
| 7,047,360 B2 * | 5/2006 | Soejima et al. | ............. | 711/114 |
| 7,100,077 B2 * | 8/2006 | Saika | .......................... | 714/15 |
| 7,177,979 B2 * | 2/2007 | Kuwamura | .................. | 711/112 |
| 2002/0049886 A1 * | 4/2002 | Furuya et al. | ................ | 711/114 |
| 2002/0191537 A1 * | 12/2002 | Suenaga | ..................... | 370/221 |
| 2003/0135782 A1 * | 7/2003 | Matsunami et al. | ............ | 714/5 |

FOREIGN PATENT DOCUMENTS

| | | | |
|---|---|---|---|
| JP | 08-202501 | | 8/1996 |
| JP | 11-194898 | | 7/1999 |
| JP | 2001-256000 | * | 9/2001 |
| JP | 2002-149500 | | 5/2002 |

* cited by examiner

*Primary Examiner*—Robert W. Beausoliel, Jr.
*Assistant Examiner*—Elmira Mehrmanesh
(74) *Attorney, Agent, or Firm*—Foley & Lardner LLP

(57) ABSTRACT

A trouble case point update unit subtracts point from point stored in a trouble point storage unit when a trouble occurs. A processing-time-reference exceeding case point update unit subtracts point from point stored in the trouble point storage unit when a response delay occurs. A trouble point recovery unit adds point to the point stored trouble point storage unit and processing-time-reference exceeding case point storage unit when a predetermined time passes since the last addition and storage. A point initialization unit sets the points stored in the trouble point storage unit and processing-time-reference exceeding case point storage unit to an initial point when a defective component is replaced. A degradation determination unit degrades a defective component in a case where the point in the trouble point storage unit or processing-time-reference exceeding case point storage unit become equal to or lower than a reference point.

21 Claims, 12 Drawing Sheets

FIG. 2

| DISK NUMBER | POINT |
|---|---|
| 1 | 600 |
| 2 | 600 |
| 3 | 600 |
| 4 | 600 |
| ⋮ | ⋮ |
| N-1 | 600 |
| N | 600 |
| 1 | 600 |
| 2 | 600 |
| 3 | 600 |
| 4 | 600 |
| ⋮ | ⋮ |
| N-1 | 600 |
| N | 600 |

TROUBLE CASE TABLE 101 (rows 1 through N)

PROCESSING-TIME-REFERENCE EXCEEDING CASE TABLE 102 (second set of rows 1 through N)

FIG. 8

EQUAL-TO/UNDER-REFERENCE-VALUE DISK NUMBER TABLE  103

| DISK NUMBER | EQUAL-TO/UNDER-REFERENCE-VALUE FLAG |
|---|---|
| 00 | 0/1 |
| 01 | 0/1 |
| ⋮ | ⋮ |
| 0N | 0/1 |
| 10 | 0/1 |
| 11 | 0/1 |
| ⋮ | ⋮ |
| 1N | 0/1 |

FIG. 9

RATE ADJUSTING TABLE 104

| DISK NUMBER | ADJUSTING FLAG |
|---|---|
| 00 | 0/1 |
| 01 | 0/1 |
| ⋮ | ⋮ |
| 0N | 0/1 |
| 10 | 0/1 |
| 11 | 0/1 |
| ⋮ | ⋮ |
| 1N | 0/1 |

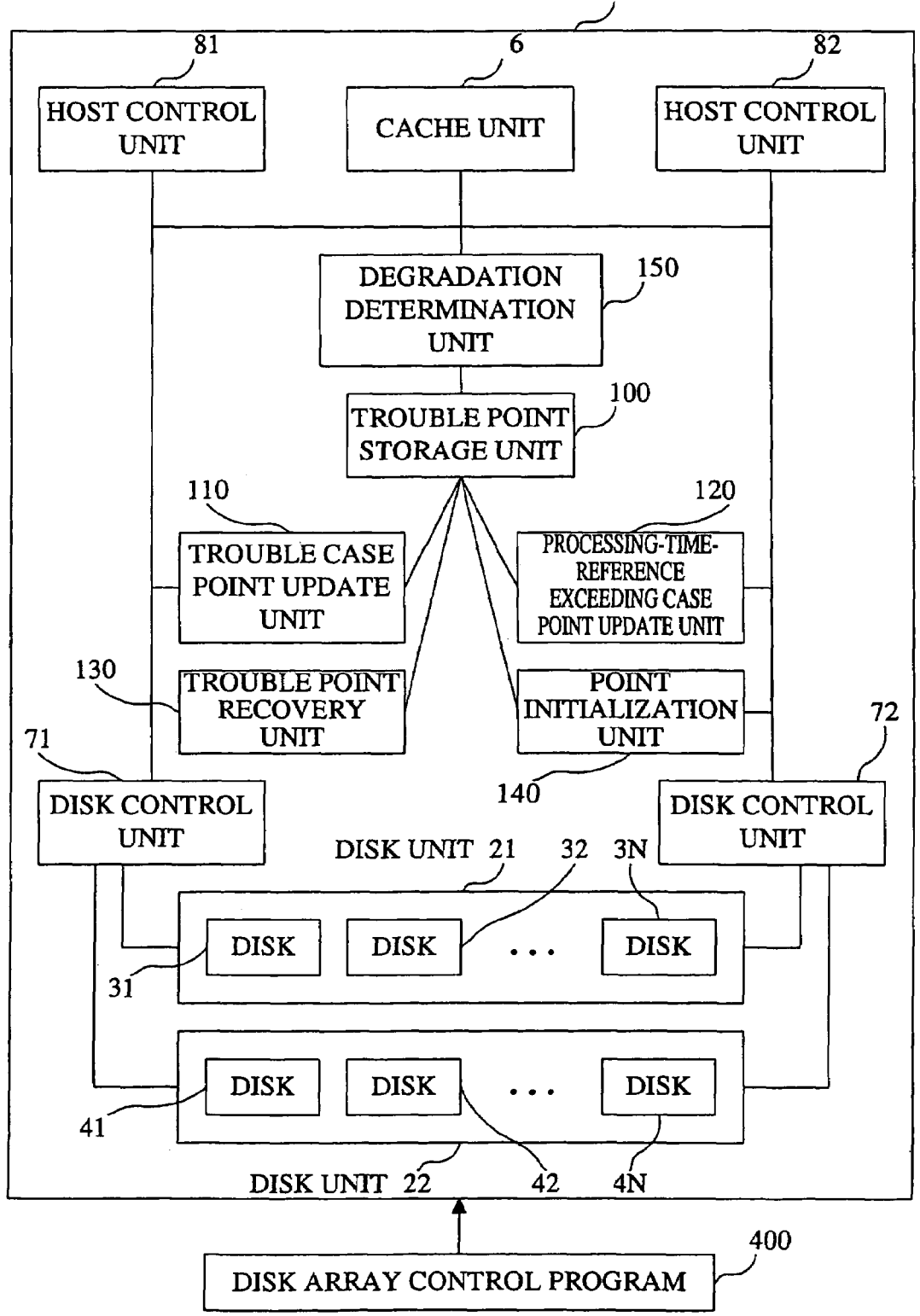

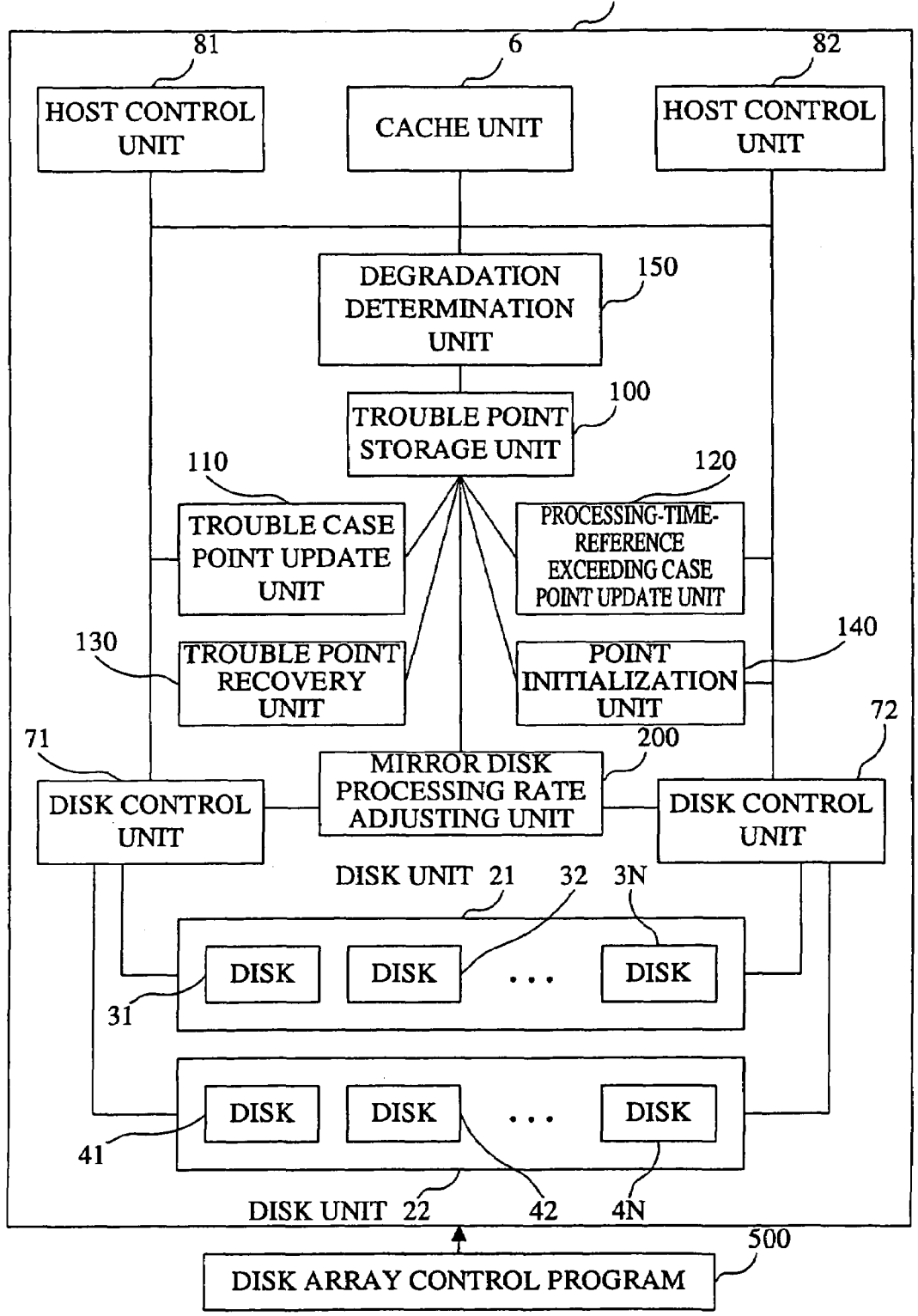

US 7,409,579 B2

DISK ARRAY DEVICE HAVING POINT VALUE ADDED OR SUBTRACTED FOR DETERMINING WHETHER DEVICE IS DEGRADED

BACKGROUND OF THE INVENTION

1. Field of the Invention

The present invention relates to a disk array device, and particularly relates to a disk array device having a function for degrading a structural component.

2. Description of the Related Art

Unexamined Japanese Patent Application KOKAI Publication No. H11-194898 discloses a disk array device. This disk array device retries a processing (reading and wiring) toward a disk device when the processing is finished in an abnormal state. If the disk array device succeeds in the retrial, it continues the use of the disk device, while if the disk array device fails in the retrial, it degrades (separates) the disk device.

According to this conventional disk array device, in a case where although frequently finished in an abnormal state, a processing can be properly executed if it is retried, the processing target disk device can not be degraded. In this case, since responses to a host device from the disk array device are delayed, processes at the host device in an online operation are delayed, possibly causing troubles in the execution of the operation.

Further, according to this disk array device, if a state where a processing, though can be finished properly, requires a long time to be executed continues, responses to a host device from the disk array device are delayed, causing delay in processes at the host device.

Further, according to this disk device, if a processing is finished in an abnormal state or a processing time increases, the processing performance of the overall disk array device drops. As a result, responses to a host device from the disk array device are delayed, causing delay in processes at the host device.

The above-described problems occur in other structural components (for example, a memory and an MPU (Micro Processor Unit)) than the disk device.

SUMMARY OF THE INVENTION

The present invention was made in view of the above-described problems, and a first object of the present invention is to provide a disk array device capable of degrading a structural component, even in a case where a prior art can not degrade such a structural component.

A second object of the present invention is to provide a disk array device capable of degrading a structural component, even in a case where a processing is finished in an abnormal state at a frequency at which a prior art can not degrade such a structural component.

A third object of the present invention is to provide a disk array device capable of degrading a structural component, even in a case where a state where a processing, though can be finished properly, requires a long time to be executed continues.

A fourth object of the present invention is to provide a disk array device capable of restricting a drop of its processing performance, even in a case where the disk array device includes a structural component for which a processing is finished in an abnormal state or requires an increasing time to be executed.

A disk array device according to a first aspect of the present invention is a disk array device including a component that can be degraded, and comprising:

a trouble point storage unit which stores a point value of the component;

a point update unit which subtracts a predetermined point value from the point value stored in said trouble point storage unit and stores the subtracted point value in said trouble point storage unit, when a processing fault occurs on the component;

a degradation unit which degrades the component when the point value stored in said trouble point storage unit falls below a reference value; and a trouble point recovery unit which adds an another predetermined point value to the point value stored in said trouble point storage unit, when a predetermined time period passes since the trouble recovery unit had added to the point value a last time.

A disk array device according to a second aspect of the present invention is a disk array device including a component that can be degraded, and comprising:

a trouble point storage unit which stores a point value of the component;

a point update unit which adds a predetermined point value from the point value stored in said trouble point storage unit and stores the added point value in said trouble point storage unit, when a processing fault occurs on the component;

a degradation unit which degrades the component when the point value stored in said trouble point storage unit exceeds a reference value; and a trouble point recovery unit which subtracts an another predetermined point value to the point value stored in said trouble point storage unit, when a predetermined time period passes since the trouble point recovery unit had added to the point value a last time.

A disk array device according to a third aspect of the present invention is a disk array device which can degrade a plurality of disks and comprises:

a trouble point storage unit which stores point values of each disk;

a point update unit which subtracts a predetermined point value from the corresponding point value stored in said trouble point storage unit and stores the subtracted point value in said trouble point storage unit, when a processing fault occurs on one of the disks;

a degradation unit which degrades a corresponding disk when the point value stored in said trouble point storage unit falls below a reference value; and a trouble point recovery unit which adds an another predetermined point value to each point values stored in said trouble point storage unit, when a predetermined time period passes since the trouble point recovery unit had added to the point value a last time.

In the above-described disk array device, wherein said trouble point storage unit comprises a trouble case table storing point values of each disk and a processing-time-reference exceeding case table storing point values of each disk;

said disk array device further comprises a processing-time-reference exceeding case point update unit which subtracts a predetermined point value from the point value stored in said processing-time-reference exceeding case table, in a case where a processing time for a required processing exceeds a reference time on a disk;

wherein said trouble case point update unit updates point value stored in said trouble case table; and wherein said degradation unit degrades a corresponding disk when the point value stored in said trouble case table falls below a first reference value or the point value stored in said processing-time-reference exceeding case table falls below a second reference value.

In the above-described disk array device, said disk array device further comprises a point initialization unit which sets, in a case where a defective disk is replaced, point value corresponding to the defective disk stored in said trouble point storage unit to an initial value.

In the above-described disk array device, said degradation unit receives a point update notification concerning a disk number from said trouble case point update unit, and determines whether the point value stored in said trouble point storage unit in association with the disk number is equal to or lower than a predetermined reference value, and degrades a disk having the disk number in a case where determining that the point value is equal to or lower than the reference value.

In the above-described disk array device, said point update unit notifies information indicating that the point value has been updated to said degradation unit.

A disk array device according to a fourth aspect of the present invention is a disk array device comprising:

a trouble point storage unit which stores a point value of the component;

a point update unit which subtracts a predetermined point value from the point value stored in said trouble point storage unit and stores the subtracted point value in said trouble point storage unit, when a processing fault occurs on the component;

a processing rate adjusting unit which lowers a processing rate of a component in a case where the point value of the component stored in said trouble point storage unit becomes equal to or lower than a reference value, and sets the processing rate of the component to a predetermined normal state in a case where the point value of the component stored in said trouble point storage unit exceeds the reference value; and a trouble point recovery unit which adds some point value to the point value stored in said trouble point storage unit, when a predetermined time period passes since the trouble point recovery unit had added to the point value a last time.

A disk array device according to a fifth aspect of the present invention is a disk array device which can degrade a plurality of disks comprising:

a trouble point storage unit which stores point values of each disk;

a point update unit which subtracts a predetermined point value from the corresponding point value stored in said trouble point storage unit and stores the subtracted point value in said trouble point storage unit, when a processing fault occurs on a one of the disks;

a processing rate adjusting unit which lowers a processing rate of a disk in a case where the point value of the disk stored in said trouble point storage unit becomes equal to or lower than a reference value, and sets the processing rate of the disk to a predetermined normal state in a case where the point value of the disk stored in said trouble point storage unit exceeds the reference value; and a trouble point recovery unit which adds an another predetermined point value to each point values stored in said trouble point storage unit, when a predetermined time period passes since the trouble point recovery unit had added to the point value a last time.

For example, the plurality of disks is mirrored.

In this case, said processing rate adjusting unit lowers a processing rate of a disk and raises a processing rate of a disk paired with the disk in a case where the point value of the disk stored in said trouble point storage unit becomes equal to or lower than the reference value, and sets the processing rate of the disk and the processing rate of the paired disk to the predetermined normal state in a case where the point value of the disk stored in said trouble point storing unit exceeds the reference value.

In the above-described disk array device, said processing rate adjusting unit reads the point values of each disk storing in said trouble point storage unit;

determines whether or not the point value change from greater than the reference value to equal to or lower than the reference value, and lowers a processing rate of a disk in a case where determining that the point value of the disk change to equal to or lower than the reference value; and determines whether or not the point value change from equal to or lower than the reference value to greater than the reference value, and adjusts a processing rate of a disk so as to set a predetermined initial rate in a case where determining that the point value of the disk change to greater than the reference value.

A component degradation method according to a sixth aspect of the present invention is a component degradation method in which a disk array device, having a plurality of components degradable and a memory storing point values regarding each of the plurality of components, comprises:

subtracting a predetermined point value from the point value stored in said memory and storing the subtracted point value in said memory, when a processing fault occurs on one of the components;

degrading the component when the point value stored in said memory falls below a reference value; and adding an another predetermined point value to the point value stored in said memory, when a predetermined time period passes since a last addition of the point value.

A disk degradation method according to a seventh aspect of the present invention is a disk degradation method in which a disk array device, having a plurality of disks degradable and a memory storing point values regarding each of the plurality of disks, comprises:

subtracting a predetermined point value from the corresponding point value stored in said memory and storing the subtracted point value in said memory, when a processing fault occurs on one of the disks;

degrading a corresponding disk when the point value stored in said memory falls below a reference value; and adding an another predetermined point value to each point values stored in said memory, when a predetermined time period passes since a last addition of the point value.

A method of restricting a drop in performance of a disk array device according to an eighth aspect of the present invention is a method of restricting a drop in performance of a disk array device wherein a disk array device, having a plurality of disks, a memory storing point values regarding each of the plurality of disks comprises:

subtracting a predetermined point value from the corresponding point value stored in said memory and stores the subtracted point value in said memory, when a processing fault occurs on one of the disks;

lowering a processing rate of a disk in a case where the point value of the disk stored in said memory becomes equal to or lower than a reference value;

setting the processing rate of the disk to a predetermined normal state in a case where the point value of the disk stored in said memory exceeds the reference value; and adding an another predetermined point value to each point values stored in said memory, when a predetermined time passes since a last addition of the point value.

In above-described method of restricting a drop in performance of a disk array device, said disk array device further has a control unit controlling read processing and write processing on each of the plurality of disks.

In this case, said method of restricting a drop in performance of a disk array further comprises:

issuing an instruction to the control unit so that a processing rate of a disk is lowered in a case where it is detected that the point value of the disk stored in the memory becomes equal to or lower than the reference value, and issuing an instruction to said control unit so that the processing rate of the disk is changed to a predetermined normal rate in a case where it is detected that the point value of the disk stored in the memory becomes greater than the reference value.

A computer program according to a tenth aspect of the present invention is a computer program for controlling a computer having a degradable component to act as:

a trouble point storage unit which stores a point value of the component;

a point update unit which subtracts a predetermined point value from the point value stored in said trouble point storage unit and stores the subtracted point value in said trouble point storage unit, when a processing fault occurs on the component;

a degradation unit which degrades the component when the point value stored in said trouble point storage unit falls below a reference value; and a trouble point recovery unit which adds an another predetermined point value to the point value stored in said trouble point storage unit, when a predetermined time period passes since the trouble recovery unit had added to the point value a last time.

A computer program according to a eleventh aspect of the present invention is a computer program for controlling a computer having a plurality of degradable disks to act as:

a trouble point storage unit which stores point values of each disks;

a point update unit which subtracts a predetermined point value from the corresponding point value stored in said trouble point storage unit and stores the subtracted point value in said trouble point storage unit, when a processing fault occurs on one of the disks;

a degradation unit which degrades a corresponding disk when the point value stored in said trouble point storage unit falls below a reference value; and a trouble point recovery unit which adds an another predetermined point value to each point value stored in said trouble point storage unit, when a predetermined time period passes since the trouble point recovery unit had added to the point value a last time.

A computer program according to a twelfth aspect of the present invention is a computer program for controlling a computer having a plurality of degradable disks to act as:

a trouble point storage unit which stores point values of each disk;

a point update unit which subtracts a predetermined point value from the corresponding point value stored in said trouble point storage unit and stores the subtracted point value in said trouble point storage unit, when a processing fault occurs on a one of the disks;

a processing rate adjusting unit which lowers a processing rate of a disk in a case where the point value of the disk stored in said trouble point storage unit becomes equal to or lower than a reference value, and sets the processing rate of the disk to a predetermined normal state in a case where the point value of the disk stored in said trouble point storage unit exceeds the reference value; and a trouble point recovery unit which adds an another predetermined point value to each point values stored in said trouble point storage unit, when a predetermined time passes since the trouble point recovery unit added to the point value a last time.

BRIEF DESCRIPTION OF THE DRAWINGS

These objects and other objects and advantages of the present invention will become more apparent upon reading of the following detailed description and the accompanying drawings in which:

FIG. 2 is a diagram for explaining the contents of a trouble case table and a processing-time-reference exceeding case table in a trouble point storage unit shown in FIG. 1;

FIG. 8 is a diagram for explaining the contents of an equal-to/under-reference-value disk number table generated by a mirror disk processing rate adjusting unit shown in FIG. 7;

FIG. 9 is a diagram for explaining the contents of a rate adjusting table used by the mirror disk processing rate adjusting unit shown in FIG. 7;

FIG. 11 is a block diagram showing a structure of a disk array device according to a third embodiment of the present invention; and FIG. 12 is a block diagram showing a structure of a disk array device according to a fourth embodiment of the present invention.

DETAILED DESCRIPTION OF THE PREFERRED EMBODIMENTS

Embodiments of the present invention will be explained below with reference to the drawings.

First Embodiment

Figure 1:
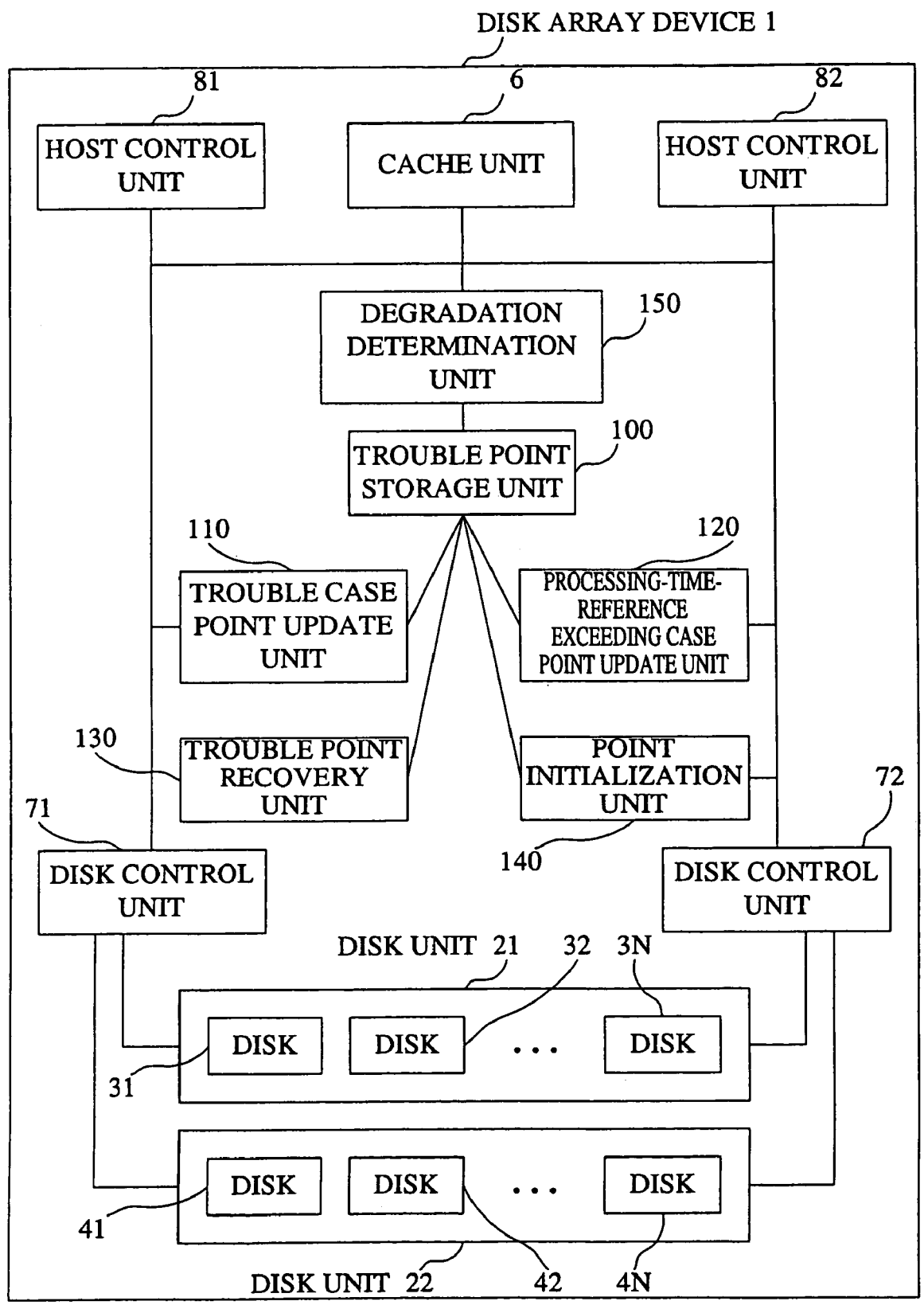
FIG. 1 is a block diagram showing a structure of a disk array device according to a first embodiment of the present invention.
Figure 3:
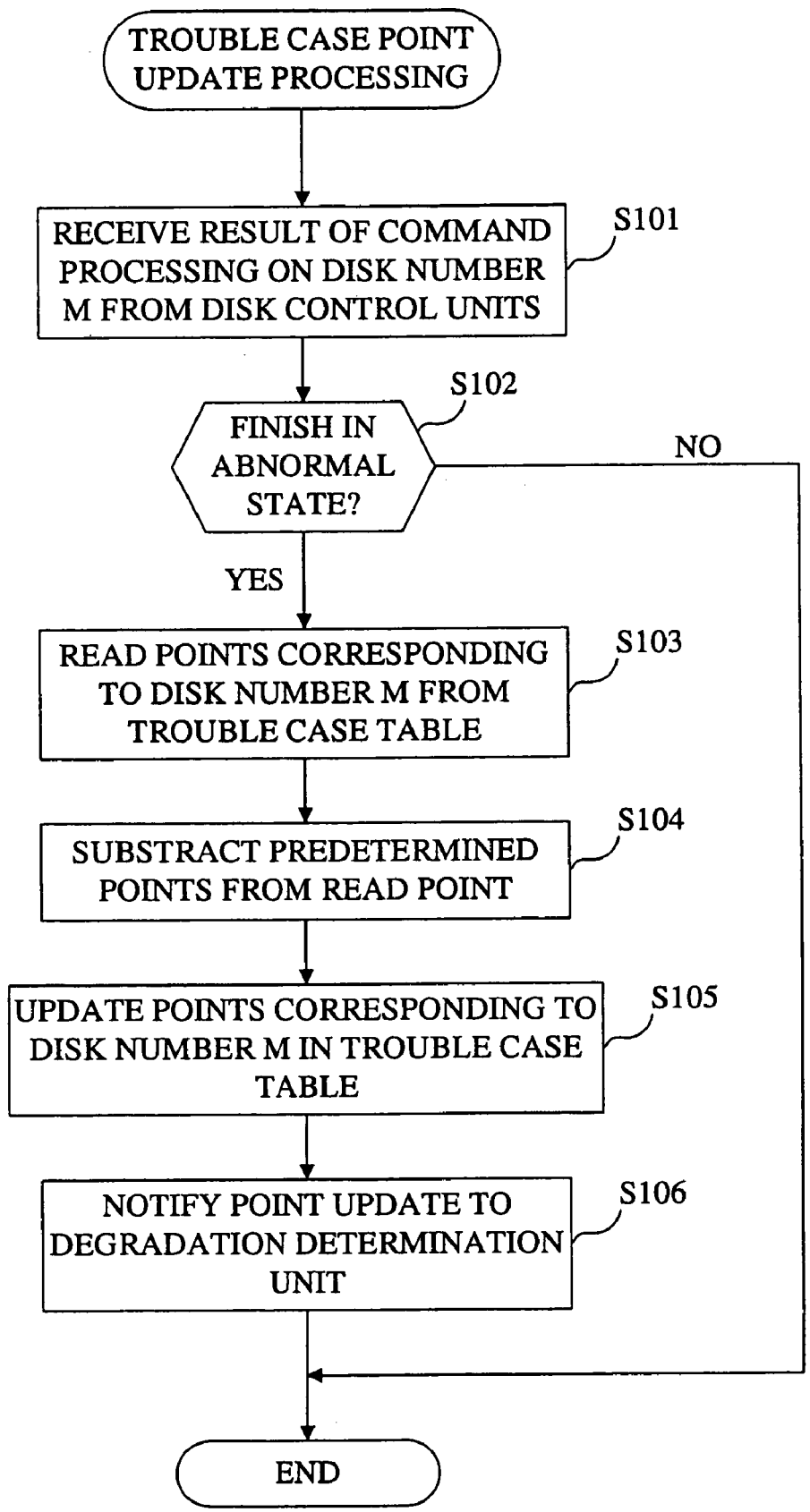
FIG. 3 is a flowchart representing a trouble case point update processing according to an embodiment of the present invention.
Figure 4:
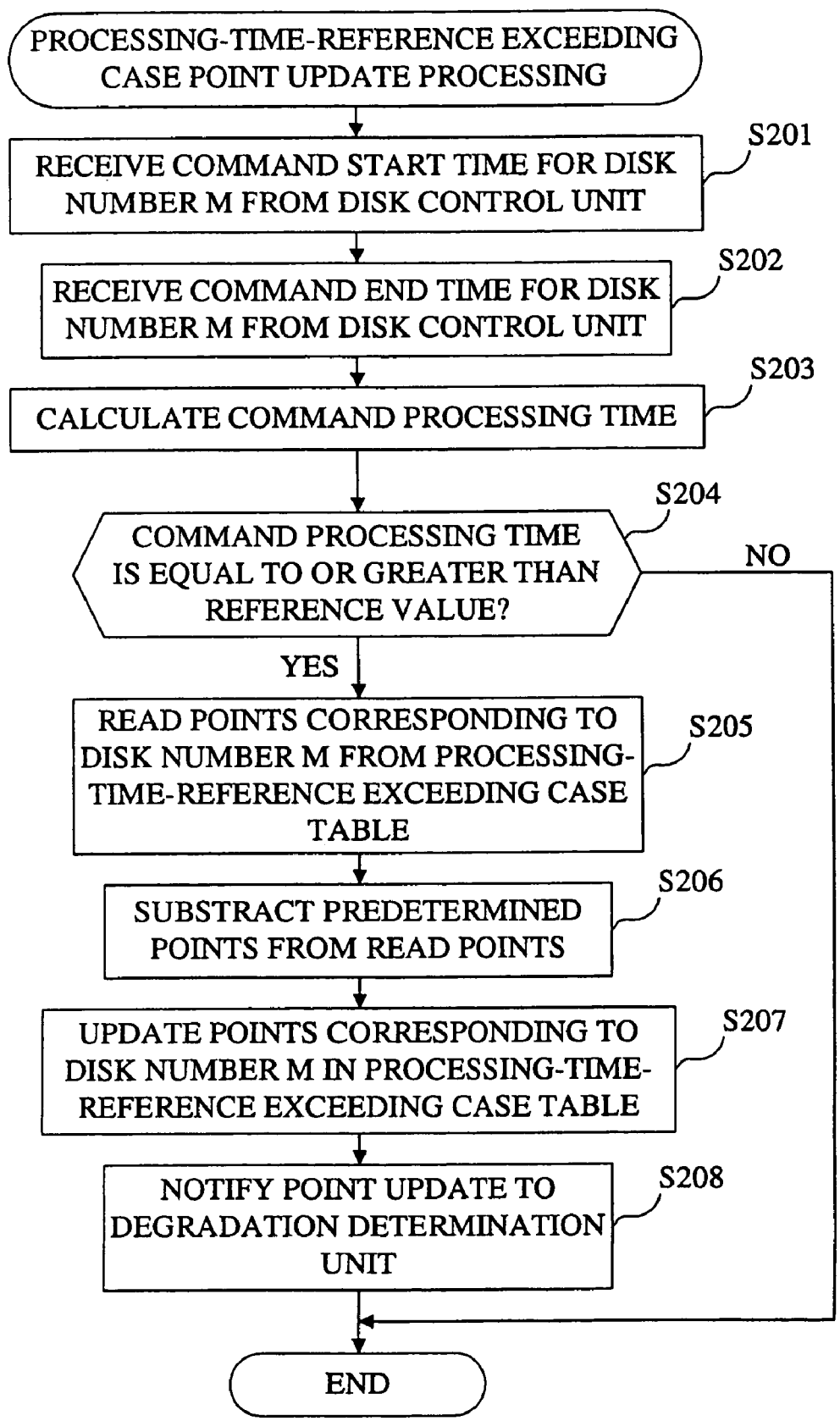
FIG. 4 is a flowchart showing a processing-time-reference exceeding case point update processing according to an embodiment of the present invention.
Figure 5:
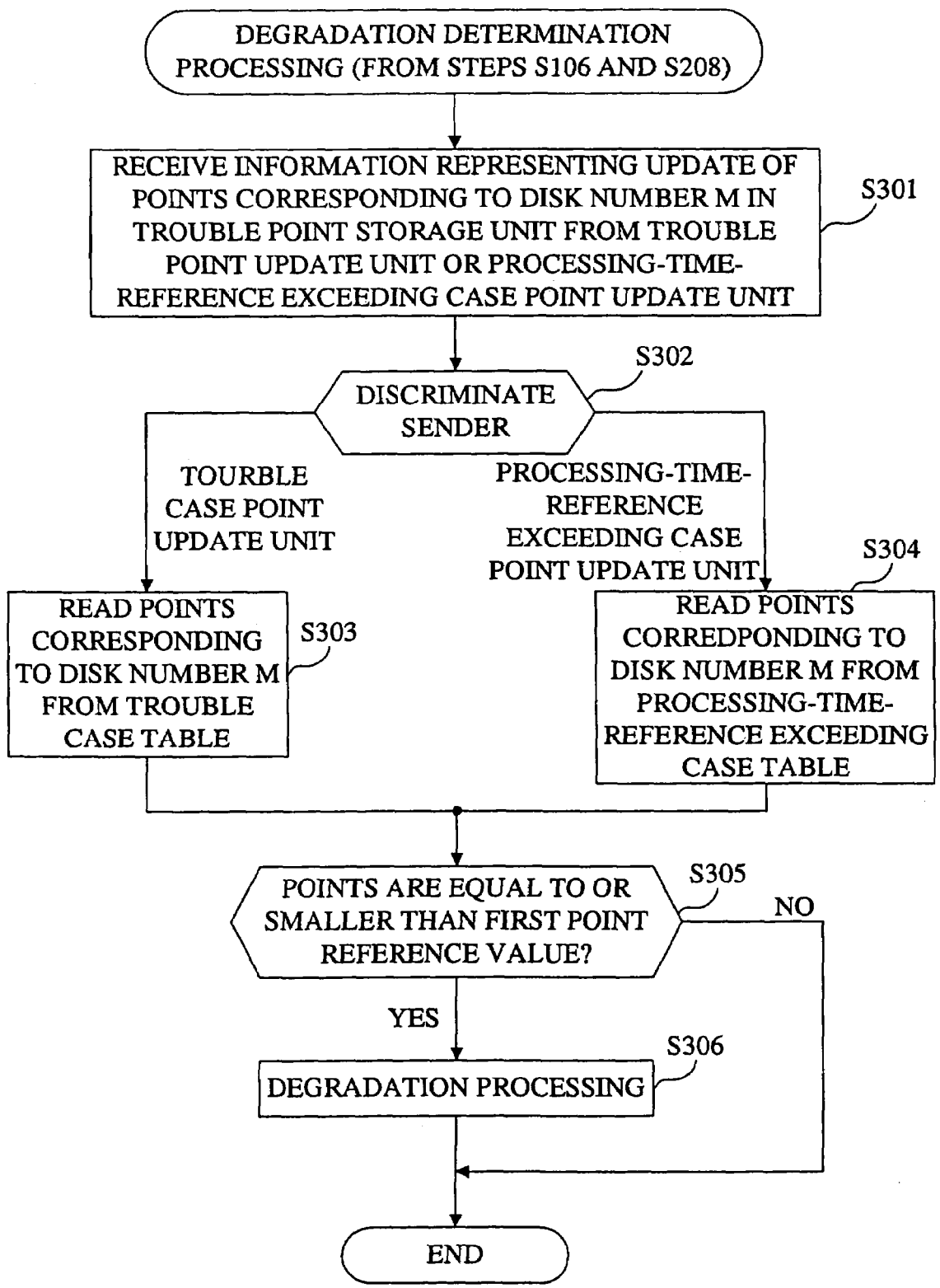
FIG. 5 is a flowchart showing a degradation determination processing according to an embodiment of the present invention.
Figure 6:
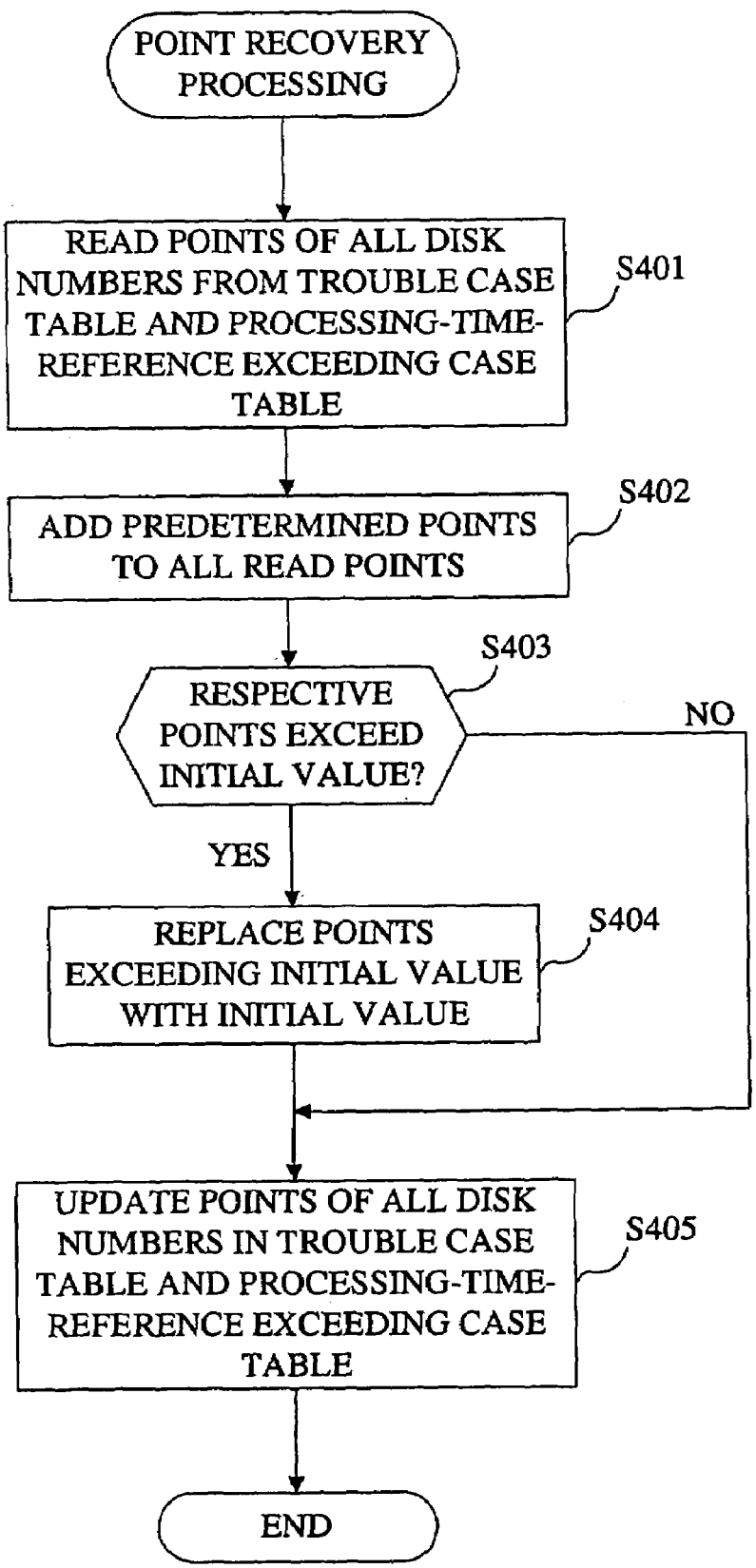
FIG. 6 is a flowchart showing a point recovery processing according to an embodiment of the present invention.

With reference to FIG. 1, the main part of a disk array device 1 according to a first embodiment of the present invention comprises disk units 21 and 22, a cache unit 6, disk control units 71 and 72, host control units 81 and 82, a trouble point storage unit 100, a trouble case point update unit 110, a processing-time-reference exceeding case point update unit 120, a trouble point recovery unit 130, a point initialization unit 140, and a degradation determination unit 150.

The disk units 21 and 22 are constituted by a plurality of disks 31 to 3N (N is an integer equal to or greater than 2) and a plurality of disks 41 to 4N, respectively.

The disk control units 71 and 72 process various commands such as reading and writing of data, etc. towards the disks 31 to 3N and 41 to 4N in accordance with instructions from the host control units 81 and 82. The disk control units 71 and 72 have a time stamp generation unit such as a timer, obtain a start time and an end time of processing of the commands from the time stamp generation unit, and send them to the processing-time-reference exceeding case point update unit 120. The disk control units 71 and 72 stop the processing of various commands towards the disks upon reception of an instruction from the degradation determination unit 150.

The host control units 81 and 82 are connected to a host via an unillustrated interface. The host control units 81 and 82 perform services for the host, such as command reception, data transfer, status response, etc. The host control units 81 and 82 are also connected to the cache unit 6 and the disk control units 71 and 72 via an internal bus for sending and receiving data to and from therebetween.

The trouble point storage unit 100 is constituted by a rewritable storage device such as a RAM (Random Access Memory), etc., and stores point values which are values indicative of the degree of proper operation of the disks 31 to 3N and 41 to 4N. Hereinafter, "point value" will be simply referred to as "point."

With reference to FIG. 2, the trouble point storage unit 100 101 and a processing-time-reference exceeding case table 102, and stores points correspondingly to disk numbers assigned to the respective disks. The disk numbers are assigned to the disks 31 to 3N and 41 to 4N uniquely in the disk array device 1. Each point in the trouble case table 101 and processing-time-reference exceeding case table 102 is initialized by the point initialization unit 140 when the disk array device 1 is activated. In the present embodiment, the initial value is set to 600 points.

The trouble case point update unit 110 detects a trouble when the trouble happens due to a command processing being finished in an abnormal state, etc., and updates the points of the corresponding disk number in the trouble case table 101 by subtracting predetermined points.

The processing-time-reference exceeding case point update unit 120 updates the points of a corresponding disk number in the processing-time-reference exceeding case table 102 by subtracting predetermined points, in a case where a command processing is properly finished but the command processing time exceeds a predetermined processing time reference value (for example, 100 milliseconds).

The trouble point recovery unit 130 updates all the points in the trouble case table 101 and processing-time-reference exceeding case table 102 by adding predetermined points at each predetermined time interval (for example, every 1 second). In a case where the initial value is exceeded by the addition, the points are updated to the initial value.

The point initialization unit 140 sets all the points in the trouble case table 101 and processing-time-reference exceeding case table 102 to the initial value when the disk array device 1 is activated. In a case where a degraded disk is replaced with a new one, the point initialization unit 140 sets the points corresponding to the disk number of the replaced disk to the initial value in the trouble case table 101 and processing-time-reference exceeding case table 102.

The degradation determination unit 150 determines that the points stored in the trouble case table 101 and processing-time-reference exceeding case table 102 are under a predetermined reference value (for example, 0 point, and hereinafter referred to as first point reference value), and degrades the corresponding disk.

Next, an operation of the disk array device 1 according to the first embodiment will be explained with reference to FIG. 1 to FIG. 6.

It is assumed that in a command processing by the disk control units 71 and 72 towards the disks 31 to 3N and 41 to 4N, a trouble occurs in one of the disks. Here, in a case where the disk control units 71 and 72 receive a check condition report (i.e. a report of impossibility of operation) from the disks 31 to 3N and 41 to 4N, the trouble may be a time-out trouble of the command processing time exceeding the predetermined processing time reference value (allowable time), or an interface trouble such as a parity error, a CRC (Cyclic Redundancy Check) error, etc. A trouble case point update processing or a processing-time-reference exceeding case point update processing is executed in accordance with the kind of the trouble, thereby the points retained by the troubled disk is decreased. When this processing is completed, a degradation determination processing is executed next wherein the troubled disk is degraded if its retained points satisfy a predetermined condition. Further, points are added to the points retained by each disk at every predetermined time interval (for example, every 1 second) in a point recovery processing. Each processing to be described below is repeatedly executed.

The disk control units 71 and 72 send the result of a command processing executed on a disk having a disk number M (M being an integer equal to or greater than 1 and equal to or smaller than N) to the trouble case point update unit 110. The trouble case point update unit 110 starts a trouble case point update processing. The trouble case point update unit 110 receives the result of the processing on the disk having the disk number M (step S101), and determines whether the processing result indicates that the processing is finished in an abnormal state (step S102). In a case where determining that the processing result indicates a finish in an abnormal state (step S102: YES), the trouble case point update unit 110 reads the points corresponding to the disk number M from the trouble case table 101 (step S103) and subtracts predetermined points (for example, 100 points) from the read points (step S104). Next, the trouble case point update unit 110 writes the points obtained by the subtraction to where the points are read, thereby updating the points corresponding to the disk number M (step S105). The trouble case point update unit 110 sends information representing that the points have been updated to the degradation determination unit 150 (step S106), and completes the trouble case point update process. On the contrary, in a case where determining that the processing result indicates that the processing is finished properly (step S102: NO), the trouble case point update unit 110 immediately terminates the trouble case point update processing.

Further, the disk control units 71 and 72 obtain a time stamp indicating a start time of a command processing from the time stamp generation unit at the time when starting the command processing, and send the start time together with a disk number M to the processing-time-reference exceeding case point update unit 120. Then, the processing-time-reference exceeding case point update unit 120 starts a processing-time-reference exceeding case update processing. First, the processing-time-reference exceeding case point update unit 120 receives the start time of the command processing on the disk number M (step S201).

Next, the disk control units 71 and 72 obtain a time stamp indicating an end time of the command processing from the time stamp generation unit at the time when ending the command processing, and send the end time together with the disk number M to the processing-time-reference exceeding case point update unit 120. Then, the processing-time-reference exceeding case point update unit 120 receives the end time of the command processing on the disk number M (step S202). The processing-time-reference exceeding case point update unit 120 calculates the command processing time based on a difference between the command end time and command start time (step S203), and determines whether the calculated processing time exceeds a predetermined processing time reference value (for example, 10 milliseconds, changeable in accordance with the amount of data processing) (step S204). In a case where determining that the processing time is longer than the processing time reference value (step S204: YES), the processing-time-reference exceeding case point update unit 120 reads the points corresponding to the disk number M from the processing-time-reference exceeding case table 102 (step S205), and subtracts predetermined points (for example, 50 points) from the read points (step S206). The processing-time-reference exceeding case point update unit 120 writes the points obtained by the subtraction back to where the points are read, thereby updating the points corresponding to the disk number M (step S207), and sends information representing that the points have been updated to the degradation determination unit 150 (step S208). On the contrary, in a case where determining that the processing time is shorter than the processing time reference value (step S204: NO), the processing-time-reference exceeding case point update unit 120 immediately ends the processing-time-reference exceeding case point update processing.

Next, the degradation determination unit 150 receives the information representing that the points have been updated from the trouble case point update unit 110 or the processing-time-reference exceeding case point update unit 120 (step S301), and starts a degradation determination processing. First, the degradation determination unit 150 determines where the information representing that the points have been updated is sent from (step S302). In a case where determining that the information is sent from the trouble case point update unit 110, the degradation determination unit 150 reads the points corresponding to the disk number M from the trouble case table 101 (step S303). In a case where determining that the information is sent from the processing-time-reference exceeding case point update unit 120, the degradation determination unit 150 reads the points corresponding to the disk number M from the processing-time-reference exceeding case table 102 (step S304). In any of the cases, the degradation determination unit 150 determines whether the read points are equal to or smaller than the predetermined first point reference value (for example, 0 point) (step S305). In a case where determining that the read points are equal to or smaller than the first point reference value (step S305: YES), the degradation determination unit 150 executes a degradation processing on the corresponding disk (step S306), and issues an instruction to the control units 71 and 72 so that the control units 71 and 72 will not write data or read data to and from this disk. Then, the degradation determination unit 150 ends the degradation determination processing. On the contrary, in a case where determining that the read points are greater than the first point reference value (step S305: NO), the degradation determination unit 150 immediately ends the degradation determination processing.

The trouble point recovery unit 130 executes a point recovery processing at every predetermined time interval. The trouble point recovery unit 130 reads the points of all the disk numbers from the trouble case table 101 and processing-time-reference exceeding case table 102 (step S401), and adds predetermined addition points (for example, 1 point) (step S402). The trouble point recovery unit 130 determines whether the respective points exceed the predetermined initial value (step S403). In a case where determining that any of the points exceed the predetermined initial value (S403: YES), the trouble point recovery unit 130 replaces all the corresponding points with the initial value (step S404), and advances to step S405. On the contrary, in a case where determining that all the points are equal to or smaller than the initial value (step S403: NO), the trouble point recovery unit 130 immediately advances to step S405. In step S405, the trouble point recovery unit 130 writes the points obtained by the addition to the original locations in the trouble case table 101 and processing-time-reference exceeding case table 102 (step S405), and ends the point recovery processing.

As explained above, even in a case where a command processing is finished in an abnormal state but its processing time exceeds a predetermined processing time reference value, the disk array device 1 can degrade the corresponding disk as a defective disk. Further, in case of an intermittent trouble, if its occurrence frequency exceeds seven times in a minute, eight times in two minutes, nine times in five minutes, and twelve times in ten minutes, the disk array device 1 can degrade the corresponding disk. Further, the disk array device 1 can reduce the number of times the point recovery processing is executed, as compared to a prior art where points are recovered each time a processing is finished properly, thereby can reduce the overhead required by this processing.

Second Embodiment

Figure 7:
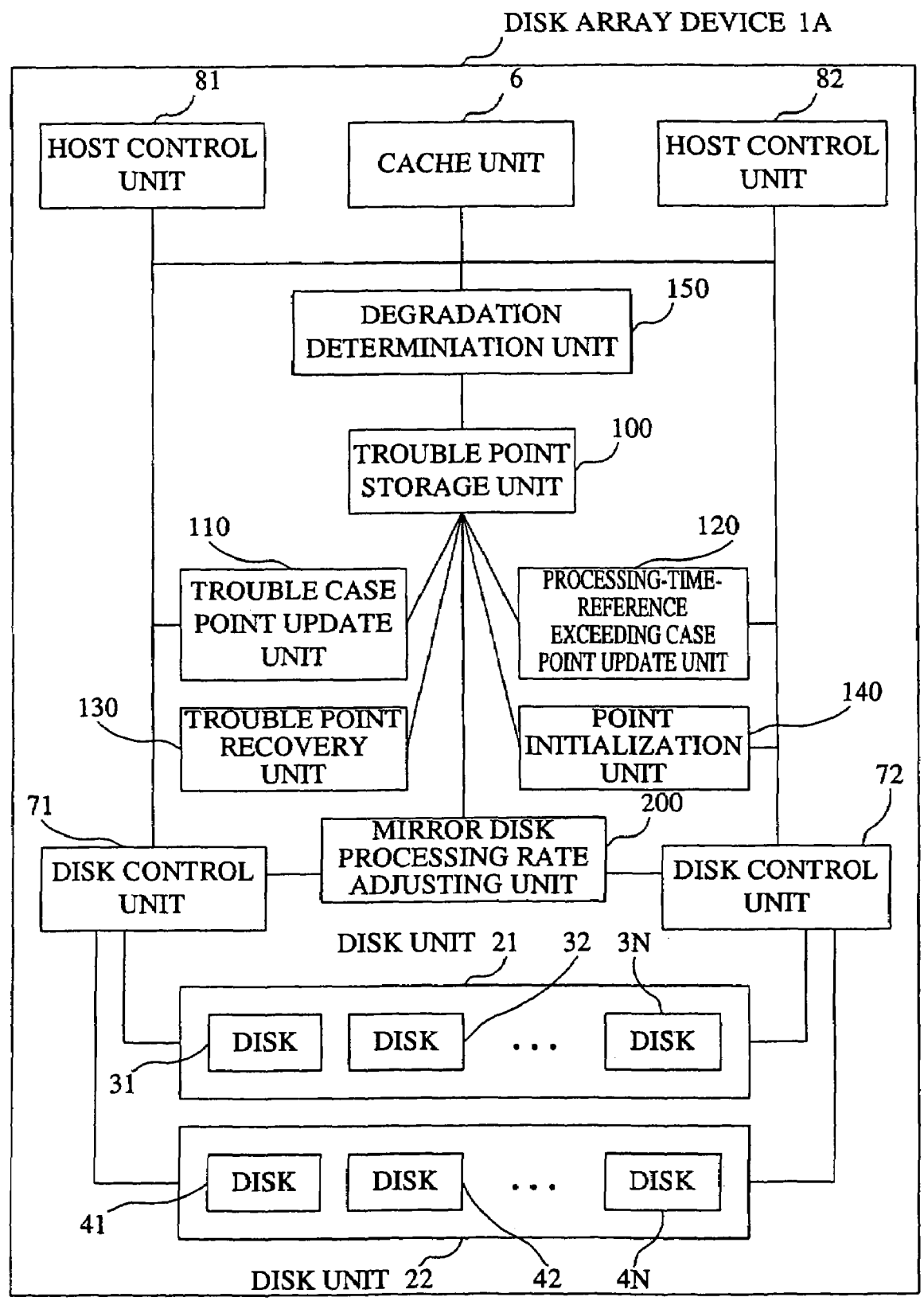
FIG. 7 is a block diagram showing a structure of a disk array device according to a second embodiment of the present invention.

FIG. 7 is a block diagram showing a structure of a disk array device 1A according to a second embodiment of the present embodiment. The operational manner of the disk array device 1A according to the present embodiment is mirroring, and thus the disk array device 1A has a mirror disk processing rate adjusting unit 200 in addition to the components of the disk array device 1 shown in FIG. 1. Accordingly, the same components as those in FIG. 1 are denoted by the same reference numerals in FIG. 7. If any of the same components as those in the first embodiment has no different aspect from the corresponding component in the first embodiment, explanation for such a component will be omitted. The disks in the disk unit 21 and the disks in the disk unit 22 are associated in one-to-one correspondence with each other, such that the disk 31 is to the disk 41, the disk 32 is to the disk 42, . . .

The mirror disk processing rate adjusting unit 200 determines that the points in the trouble case table 101 or processing-time-reference exceeding case table 102 in the trouble point storage unit 100 fall below a second point reference value (for example, 300 points) which is different from the first point reference value used by the degradation determination unit 150. When determining that the points fall below the second point reference value, the mirror disk processing rate adjusting unit 200 lowers a processing rate for a read processing (hereinafter simply referred to as processing rate) on the corresponding disk (hereinafter referred to as poor-conditioned disk), and issues an instruction to the disk control units 71 and 72 so that the processing rate for the disk associated with the poor-conditioned disk will be raised. When the points exceed the second point reference value, the mirror disk processing rate adjusting unit 200 issues an instruction to the disk control units 71 and 72 so that the normal processing rate will be recovered.

To be more specific, the mirror disk processing rate adjusting unit 200 determines whether or not the points in the trouble case table 101 or processing-time-reference exceeding case table 102 are equal to or lower than the second point reference value, and stores the determination result in a later-described equal-to/under-reference-value disk number table 103. Then, the mirror disk processing rate adjusting unit 200 compares the determination result with a value stored in a rate adjusting table 104 storing the current processing rate, and changes the processing rate if the compared values are inconsistent. After changing the processing rate, the mirror disk processing rate adjusting unit 200 updates the rate adjusting table 104 by copying the determination result stored in the equal-to/under-reference-value disk number table 103 to the rate adjusting table 104.

With reference to FIG. 8, the equal-to/under-reference-value disk number table 103 registers a plurality of pairs of disk numbers and equal-to/under-reference-value flags. The equal-to/under-reference-value flag is information representing whether or not it is appropriate to lower the processing rate. A flag "0" indicates that the processing rate needs not be lowered, and a flag "1" indicates that the processing rate needs to be lowered.

With reference to FIG. 9, the rate adjusting table 104 registers a plurality of pairs of disk numbers and adjusting flags. In the rate adjusting table 104, an adjusting flag corresponding to a disk number of a disk whose processing rate needs to be adjusted is registered as "1", and an adjusting flag corresponding to a disk number of a disk whose processing rate needs not be adjusted is registered as "0".

The point initialization unit 140 performs an operation of setting a flag corresponding to a disk number of a disk, which has been degraded and replaced, to an initial value "0" in the rate adjusting table 104, in addition to the operation in the first embodiment.

The disk control units 71 and 72 perform an operation of changing the processing rate of a pair of disks upon reception of an instruction from the mirror disk processing rate adjusting unit 200, in addition to the operations in the first embodiment. To be more specific, the disk control units 71 and 72 do not change a processing rate for a write command because it is necessary to write the same content to two disks. That is, the processing rate is 50% (normal disk): 50% (poor-conditioned disk). However, in a case where an instruction for changing the processing rate is issued, the disk control units 71 and 72 make the processing rate for a read command 70% (normal disk): 30% (poor-conditioned disk), for example. (It is assumed that the processing rate in a normal case (normal rate) is 50% (normal disk): 50% (normal disk).) Due to this, it is possible to reduce reading from the poor-conditioned disk and to avoid a drop in the performance.

Figure 10:
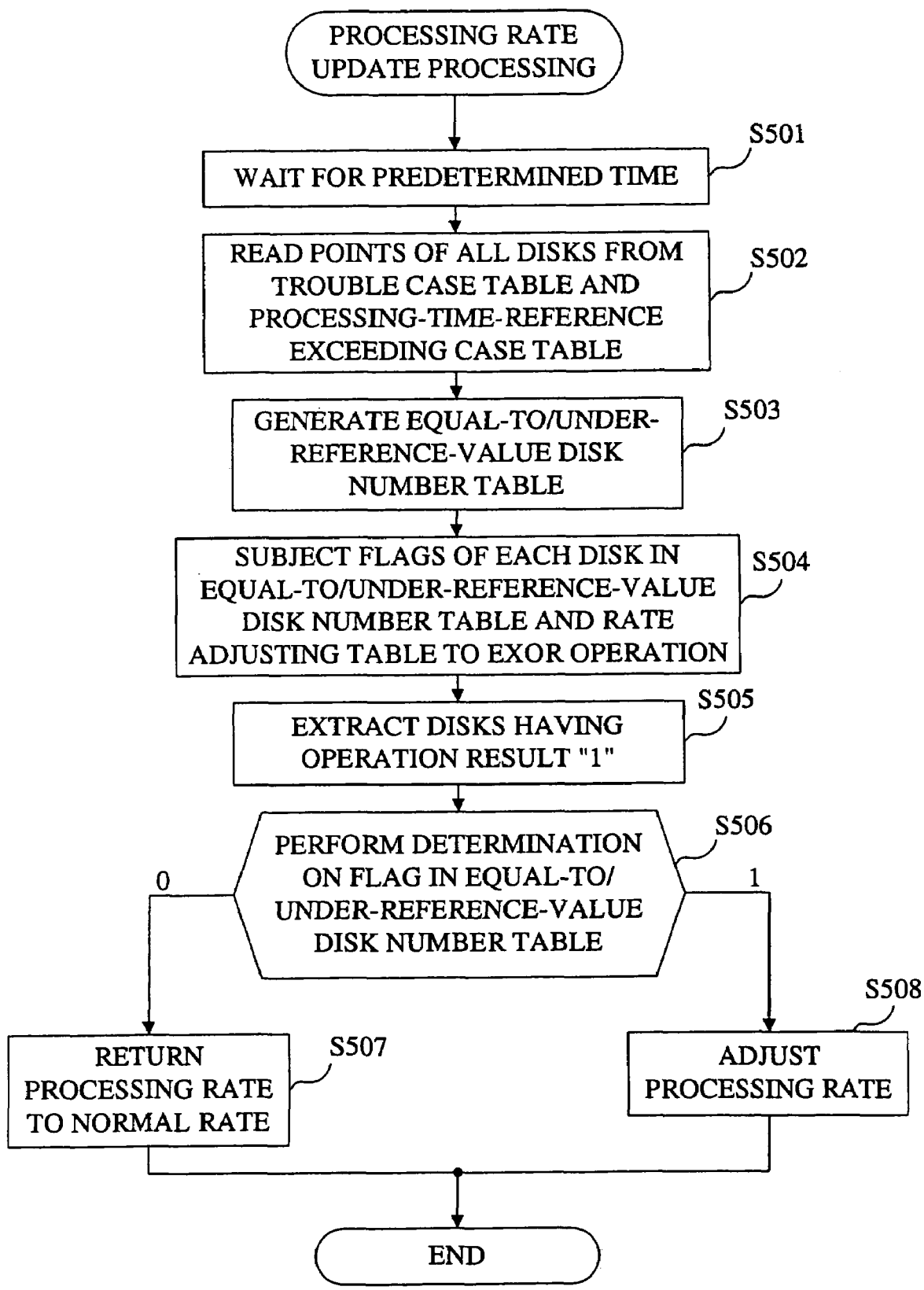
FIG. 10 is a flowchart showing a processing rate update processing executed by the mirror disk processing rate adjusting unit shown in FIG. 7.

In addition to the processings explained in the first embodiment, the disk array device 1A executes a processing rate update processing. This processing rate update processing will now be explained with reference to FIG. 10. This processing rate update processing will be executed repeatedly at every predetermined time interval.

The mirror disk processing rate adjusting unit 200 starts the processing rate update processing after waiting for a predetermined time to pass (step S501). First, the mirror disk processing rate adjusting unit 200 reads points of all the disk numbers from the trouble case table 101 and processing-time-reference exceeding case table 102 in the trouble point storage unit 100 (step S502). Next, the mirror disk processing rate adjusting unit 200 determines whether or not the points in at least one of the trouble case table 101 and processing-time-reference exceeding case table 102 are equal to or lower than the second point reference value. The mirror disk processing rate adjusting unit 200 sets an equal-to/under-reference-value flag "1" to a disk number whose points in at least one of the tables 101 and 102 are equal to or lower than the second point reference value, and sets an equal-to/under-reference-value flag "0" to a disk number whose points in both the tables 101 and 102 are greater than the second point reference value, thereby generating the equal-to/under-reference-value disk number table 103 (step S503). Then, the mirror disk processing rate adjusting unit 200 subjects the flags corresponding to each disk number in the equal-to/under-reference-value disk number table 103 and rate adjusting table 104 to exclusive or (EXOR) operation (step S504). As a result, disks whose processing rate needs to be changed are extracted. The mirror disk processing rate adjusting unit 200 extracts disks having an operation result "1" (step S505), and determines whether the value of the equal-to/under-reference-value flag of the extracted disks in the equal-to/under-reference-value disk number table 103 is "0" or "1" (step S506). If the value of the equal-to/under-reference-value flag is "0" (step S506: "0"), the mirror disk processing rate adjusting unit 200 determines that the points of the corresponding disk exceed the second point reference value by the above-described point recovery processing, and changes the processing rate of this disk to the normal rate (step S507). If the value of the equal-to/under-reference-value flag is "1" (step S506: "1"), the mirror disk processing rate adjusting unit 200 determines that the points of the corresponding disk become equal to or lower than the second point reference value by the above-described trouble case point update processing and processing-time-reference exceeding case point update processing, and adjusts the processing rate of this disk so that it is lowered (step S508). When the processing in step S507 or in step S508 is completed, the processing rate update processing ends.

In step S503, the mirror disk processing rate adjusting unit 200 may set the equal-to/under-reference-value flag to "1", in a case where the points in both of the trouble case table 101 and processing-time-reference exceeding case table 102 are equal to or lower than the second point reference value.

As explained above, according to the second embodiment, a drop in the performance of the disk array device 1A whose operational manner is mirroring can be suppressed, by lowering the processing rate of a poor-conditioned disk in accordance with a frequency of trouble occurrence and a frequency of response delay occurrence.

Third Embodiment

FIG. 11 is a block diagram showing a structure of a disk array device 1 according to a third embodiment of the present invention. The disk array device 1 according to the present embodiment has a disk array control program 400 in addition to the components of the disk array device 1 in the first embodiment. Accordingly, the components other than the disk array control program 400 are denoted by the same reference numerals shown in FIG. 1.

The disk array control program 400 is read by the disk array device 1 and controls operations of the disk units 21 and 22, the cache unit 6, the disk control units 71 and 72, the host control units 81 and 82, the trouble point storage unit 100, the trouble case point update unit 110, the processing-time-reference exceeding case point update unit 120, the trouble point recovery unit 130, the point initialization unit 140, and the degradation determination unit 150 in the disk array device 1. Explanation for the operation of the disk array device 1 under the control of the disk array control program 400 will be omitted because the operation is the same as that in the first embodiment.

Forth Embodiment

FIG. 12 is a block diagram showing a structure of a disk array device 1A according to a fourth embodiment of the present invention. The disk array device 1A according to the present embodiment has a disk array control program 500 in addition to the components of the disk array device 1A shown in FIG. 7. Accordingly, the components other than the disk array control program 500 are denoted by the same reference numerals shown in FIG. 7.

The disk array control program 500 is read by the disk array device 1A likewise the disk array control program 400 of the third embodiment and controls operations of the components of the disk array device 1A. Explanation for the operation of the disk array device 1A under the control of the disk array control program 500 will be omitted because the operation is the same as that in the second embodiment.

The present invention is not limited to the above-described first to fourth embodiments, but modifications and applications of the present invention are available in various ways.

For example, addition and subtraction of points may be performed in a manner reversed from that in the above-described embodiments. For example, the initial value may be 0, the first point reference value may be 600 points, and the second point reference value may be 300 points.

Further, in the above-described first to fourth embodiments, a disk is degraded in accordance with the interval of occurrence of a trouble and the interval of occurrence of a processing delay. However, a disk may be degraded in accordance with only a trouble or a processing delay.

Further, values such as the initial points in the trouble case table 101 and processing-time-reference exceeding case table 102, the points to be subtracted when the trouble case point update unit 10 and processing-time-reference exceeding case point update unit 120 update the trouble case table 101 and processing-time-reference exceeding case table 102, and the first point reference value which is the reference based on which the degradation determination unit 150 determines to degrade a disk may be arbitrarily set. Further, the trouble case table 101 and the processing-time-reference exceeding case table 102 may be united. In this case, the points to be subtracted when a trouble occurs and when a processing delay occurs may be different. Further, the disk array device may be structured such that the points are updated by a non-illustrated maintenance terminal or the like.

In the above-described embodiments, an example of degrading a disk is illustrated. However, the disk array device may be structured such that components having their redundancies such as the cache unit 6 if it has a redundant unit, the disk control units 71 and 72, and the host control units 81 and 82 may be degraded.

In the above-described embodiments, the disk control units 71 and 72 have the time stamp generation unit. However, the host control units 81 and 82 may measure the processing time for each command.

In the second embodiment, the disk control units 71 and 72 may determine the processing rate for a read processing based on the content of the flag in the rate adjusting table 104. That is, if the flags of two associated disks are both "0", the control units 71 and 72 read requested data from the two disks at a rate of 1:1. If any one of the flags of the two disks is "1", the control units 71 and 72 read requested data from the two disks at a rate of 3:7 where 3 is applied to the disk having the flag "1". In this case, the equal-to/under-reference-value disk number table 103 may not be needed. Further, in this case, the mirror disk processing rate adjusting unit 200 updates the flags in the rate adjusting table 104 in step S503, and ends the processing rate update processing. The rate for a read processing may be varied in accordance with the degree of poor condition of the disks.

In the second embodiment, a third point reference value may be set between the first point reference value and the second point reference value. In a case where the points in the trouble case table 101 and processing-time-reference exceeding case table 102 fall below the third point reference value, the processing rate for the corresponding disk may further be lowered.

In the second embodiment, the disk whose processing rate is changed to be lowered may be notified to the system manager, by blowing a warning sound or in any other ways. By doing so, a situation that there is a disk which might be broken is notified to the system manager, enabling him/her to prepare a disk for replacement before the disk which might be broken is degraded.

The disk array devices 1 and 1A according to the embodiments of the present invention can be realized not by a dedicated system but by an ordinary computer system. For example, the disk array devices 1 and 1A for executing the above-described processings can be structured by installing the disk array control programs 400 and 500 for executing any of the above-described processings from a medium (a CD-ROM, etc.) carrying those programs to a general-purpose computer to which a plurality of disk devices are connected.

In a case where an operating system (OS) takes part in some of the above-described processings, or in a case where the OS constitutes some parts of the components of the present invention, or in a case where some components have an operational program for self control, a program from which such parts are removed may be stored in a recording medium. Also in this case, a program for executing each function and each step to be performed by the computer is stored in the recording medium.

A carrier wave may be modulated by the program and may be distributed via a communication network. For example, the program may be posted on a bulletin board system (BBS) on a communication network and may be distributed via the network. The above-described processings may be executed by activating the program and executing the program under the control of the OS likewise other application programs are executed.

INDUSTRIAL APPLICABILITY

The present invention can be applied to a disk array device having a degradation function.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-42027 filed on Feb. 20, 2003 and including specification, claims, drawings and summary. The disclosure of the above Japanese Patent Application is incorporated herein by reference in its entirety.

What is claimed is:

1. A disk array device including a component that can be degraded, comprising:
a trouble point storage unit which stores a point value of the component;
a point update unit which subtracts a predetermined point value from the point value stored in said trouble point storage unit and stores the subtracted point value in said trouble point storage unit, when a processing fault occurs on the component;
a degradation unit which degrades the component when the point value stored in said trouble point storage unit falls below a reference value; and
a trouble point recovery unit which adds an another predetermined point value to the point value stored in said trouble point storage unit, when a predetermined time period passes since the trouble point recovery unit had added to the point value a last time,
wherein the predetermined point value corresponds to a first constant, the another predetermined point value corresponds to a second constant, and the first constant is not equal to the second constant.

2. A disk array device including a component that can be degraded, comprising:
a trouble point storage unit which stores a point value of the component;
a point update unit which adds a predetermined point value from the point value stored in said trouble point storage unit and stores the added point value in said trouble point storage unit, when a processing fault occurs on the component;
a degradation unit which degrades the component when the point value stored in said trouble point storage unit exceeds a reference value; and
a trouble point recovery unit which subtracts an another predetermined point value to the point value stored in said trouble point storage unit, when a predetermined time period passes since the trouble point recovery unit had subtracted to the point value a last time,
wherein the predetermined point value corresponds to a first constant, the another predetermined point value corresponds to a second constant, and the first constant is not equal to the second constant.

3. A disk array device which can degrade a plurality of disks and comprises:
a trouble point storage unit which stores point values of each disk;
a point update unit which subtracts a predetermined point value from the corresponding point value stored in said trouble point storage unit and stores the subtracted point value in said trouble point storage unit, when a processing fault occurs on one of the disks;
a degradation unit which degrades a corresponding disk when the point value stored in said trouble point storage unit falls below a reference value; and
a trouble point recovery unit which adds an another predetermined point value to each point values stored in said trouble point storage unit, when a predetermined time period passes since the trouble point recovery unit had added to the point value a last time,
wherein the predetermined point value corresponds to a first constant, the another predetermined point value corresponds to a second constant, and the first constant is not equal to the second constant.

4. The disk array device according to claim 3:
wherein said trouble point storage unit comprises a trouble case table storing point values of each disk and a processing-time-reference exceeding case table storing point values of each disk;
wherein said disk array device further comprises a processing-time-reference exceeding case point update unit which subtracts a predetermined point value from the point value stored in said processing-time-reference exceeding case table, in a case where a processing time for a required processing exceeds a reference time on a disk; and
wherein said trouble case point update unit updates point value stored in said trouble case table; and
wherein said degradation unit degrades a corresponding disk when the point value stored in said trouble case table falls below a first reference value or the point value stored in said processing-time-reference exceeding case table falls below a second reference value.

5. The disk array device according to claim 3, further comprising:
a point initialization unit which sets, in a case where a defective disk is replaced, a point value corresponding to the defective disk stored in said trouble point storage unit to an initial value.

6. The disk array device according to claim 3, wherein said degradation unit receives a point update notification concerning a disk number from said trouble case point update unit, and determines whether the point value stored in said trouble point storage unit in association with the disk number is equal to or lower than a predetermined reference value, and degrades a disk having the disk number in a case where determining that the point value is equal to or lower than the reference value.

7. The disk array device according to claim 3, wherein said point update unit notifies information indicating that the point value has been updated to said degradation unit.

8. A disk array device comprising:
a trouble point storage unit which stores a point value of the component;
a point update unit which subtracts a predetermined point value from the point value stored in said trouble point storage unit and stores the subtracted point value in said trouble point storage unit, when a processing fault occurs on the component;
a processing rate adjusting unit which lowers a processing rate of a component in a case where the point value of the component stored in said trouble point storage unit becomes equal to or lower than a reference value, and sets the processing rate of the component to a predetermined normal state in a case where the point value of the component stored in said trouble point storage unit exceeds the reference value; and
a trouble point recovery unit which adds an another predetermined point value to the point value stored in said trouble point storage unit, when a predetermined time period passes since the trouble point recovery unit added to the point value a last time,
wherein the predetermined point value corresponds to a first constant, the another predetermined point value corresponds to a second constant, and the first constant is not equal to the second constant.

9. A disk array device which can degrade a plurality of disks comprising:
a trouble point storage unit which stores point values of each disk;

a point update unit which subtracts a predetermined point value from the corresponding point value stored in said trouble point storage unit and stores the subtracted point value in said trouble point storage unit, when a processing fault occurs on one of the disks;

a processing rate adjusting unit which lowers a processing rate of a disk in a case where the point value of the disk stored in said trouble point storage unit becomes equal to or lower than a reference value, and sets the processing rate of the disk to a predetermined normal state in a case where the point value of the disk stored in said trouble point storage unit exceeds the reference value; and a trouble point recovery unit which adds an another predetermined point value to each point values stored in said trouble point storage unit, when a predetermined time period passes since the trouble point recovery unit had added to the point value a last time, wherein the predetermined point value corresponds to a first constant, the another predetermined point value corresponds to a second constant, and the first constant is not equal to the second constant.

10. The disk array device according to claim 9 wherein:

the plurality of disks is mirrored; and said processing rate adjusting unit lowers a processing rate of a disk and raises a processing rate of a disk paired with the disk in a case where the point value of the disk stored in said trouble point storage unit becomes equal to or lower than the reference value, and sets the processing rate of the disk and the processing rate of the paired disk to the predetermined normal state in a case where the point value of the disk stored in said trouble point storing unit exceeds the reference value.

11. The disk array device according to claim 10 wherein said processing rate adjusting unit:

reads the point values of each disk storing in said trouble point storage unit;

determines whether or not the point value change from greater than the reference value to equal to or lower than the reference value, and lowers a processing rate of a disk in a case where determining that the point value of the disk change to equal to or lower than the reference value; and determines whether or not the point value change from equal to or lower than the reference value to greater than the reference value, and adjusts a processing rate of a disk so as to set a predetermined initial rate in a case where determining that the point value of the disk change to greater than the reference value.

12. A component degradation method in a disk array device having a plurality of components degradable and a memory storing point values regarding each of the plurality of components, the method comprising:

subtracting a predetermined point value from the point value stored in said memory and storing the subtracted point value in said memory, when a processing fault occurs on one of the components;

degrading the component when the point value stored in said memory falls below a reference value; and adding an another predetermined point value to the point value stored in said memory, when a predetermined time period passes since a last addition of the point value, wherein the predetermined point value corresponds to a first constant, the another predetermined point value corresponds to a second constant, and the first constant is not equal to the second constant.

13. A component degradation method in a disk array device having a plurality of components degradable and a memory storing point values regarding each of the plurality of components, the method comprising:

adding a predetermined point value from the point value stored in said trouble point storage unit and storing the added point value in said trouble point storage unit, when a processing fault occurs on the component;

degrading the component when the point value stored in said trouble point storage unit exceeds a reference value; and subtracting an another predetermined point value to the point value stored in said trouble point storage unit, when a predetermined time period passes since last subtraction of the point value, wherein the predetermined point value corresponds to a first constant, the another predetermined point value corresponds to a second constant, and the first constant is not equal to the second constant.

14. A disk degradation method in a disk array device having a plurality of disks degradable and a memory storing point values regarding each of the plurality of disks, the method comprising:

subtracting a predetermined point value from the corresponding point value stored in said memory and storing the subtracted point value in said memory, when a processing fault occurs on one of the disks;

degrading a corresponding disk when the point value stored in said memory falls below a reference value; and adding an another predetermined point value to each point values stored in said memory, when a predetermined time period passes since a last addition of the point value, wherein the predetermined point value corresponds to a first constant, the another predetermined point value corresponds to a second constant, and the first constant is not equal to the second constant.

15. The disk degradation method according to claim 14, wherein said memory stores first point values and second point values regarding each of the plurality of disks; and wherein said disk degradation method further comprises:

subtracting a first predetermined point value from the corresponding first point value stored in said memory and storing the subtracted point value in said memory, when a processing fault occurs on one of the disks;

subtracting a second predetermined point value from the corresponding second point value stored in said memory and storing the subtracted point value in said memory, in a case where a processing time for a required processing exceeds a reference time on one of the disk;

degrading a corresponding disk when the first point value stored in said memory falls below a first reference value or the second point value stored in said memory falls below a second reference value; and adding an another predetermined point value to each point values stored in said memory, when a predetermined time period passes since a last addition of the point value.

16. The disk degradation method according to claim 14, wherein said disk degradation method further comprises:

setting each point value corresponding to the defective disk stored in said trouble point storage unit to an initial value, in a case where a defective disk is replaced.

17. A method of restricting a drop in performance of a disk array device wherein a disk array device, having a plurality of disks, a memory storing point values regarding each of the plurality of disks, the method comprising:

subtracting a predetermined point value from the corresponding point value stored in said memory and stores storing the subtracted point value in said memory, when a processing fault occurs on one of the disks;

lowering a processing rate of a disk in a case where the point value of the disk stored in said memory becomes equal to or lower than a reference value;

setting the processing rate of the disk to a predetermined normal state in a case where the point value of the disk stored in said memory exceeds the reference value; and adding some point value to each point value stored in said memory, when a predetermined time period passes since a last addition of the point value, wherein the predetermined point value corresponds to a first constant, the some point value corresponds to a second constant, and the first constant is not equal to the second constant.

18. The method of restricting a drop in performance of a disk array device according to claim 17, wherein said disk array device further has a control unit controlling read processing and write processing on each of the plurality of disks, and wherein the method further comprises:

issuing an instruction to the control unit so that a processing rate of a disk is lowered in a case where it is detected that the point value of the disk stored in the memory becomes equal to or lower than the reference value, and issuing an instruction to said control unit so that the processing rate of the disk is changed to a predetermined normal rate in a case where it is detected that the point value of the disk stored in the memory becomes greater than the reference value.

19. A computer readable medium storing a computer program for controlling a computer having of degradable component to act as:

a trouble point storage unit which stores a point value of the component;

a point update unit which subtracts a predetermined point value from the point value stored in said trouble point storage unit and stores the subtracted point value in said trouble point storage unit, when a processing fault occurs on the component;

a degradation unit which degrades the component when the point value stored in said trouble point storage unit falls below a reference value; and a trouble point recovery unit which adds an another predetermined point value to the point value stored in said trouble point storage unit, when a predetermined time period passes since the trouble point recovery unit had added to the point value a last time, wherein the predetermined point value corresponds to a first constant, the another predetermined point value corresponds to a second constant, and the first constant is not equal to the second constant.

20. A computer readable medium storing a computer program for controlling a computer having a plurality of degradable disks to act as:

a trouble point storage unit which stores point values of each disk;

a point update unit which subtracts a predetermined point value from the corresponding point value stored in said trouble point storage unit and stores the subtracted point value in said trouble point storage unit, when a processing fault occurs on one of the disks;

a degradation unit which degrades a corresponding disk when the point value stored in said trouble point storage unit falls below a reference value; and a trouble point recovery unit which adds an another predetermined point value to each point value stored in said trouble point storage unit, when a predetermined time period passes since the trouble point recovery unit had added to the point value a last time, wherein the predetermined point value corresponds to a first constant, the another predetermined point value corresponds to a second constant, and the first constant is not equal to the second constant.

21. A computer readable medium storing a computer program for controlling a computer having a plurality of degradable disks to act as:

trouble point storage unit which stores point values of each disk;

a point update unit which subtracts a predetermined point value from the corresponding point value stored in said trouble point storage unit and stores the subtracted point value in said trouble point storage unit, when a processing fault occurs on one of the disks;

a processing rate adjusting unit which lowers a processing rate of a disk in a case where the point value of the disk stored in said trouble point storage unit becomes equal to or lower than a reference value, and sets the processing rate of the disk to a predetermined normal state in a case where the point value of the disk stored in said trouble point storage unit exceeds the reference value; and a trouble point recovery unit which adds an another predetermined point value to each point values stored in said trouble point storage unit, when a predetermined time passes since the trouble point recovery unit added to the point value a last time, wherein the predetermined point value corresponds to a first constant, the another predetermined point value corresponds to a second constant, and the first constant is not equal to the second constant.

* * * * *